(12) United States Patent
Dyer et al.

(10) Patent No.: US 8,230,731 B2
(45) Date of Patent: Jul. 31, 2012

(54) SYSTEM AND METHOD FOR DETERMINING INCURSION OF WATER IN A WELL

(75) Inventors: Stephen Dyer, Al-Khobar (SA); Carlos Abad, Richmond, TX (US); Bruno Drochon, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 262 days.

(21) Appl. No.: 12/751,480

(22) Filed: Mar. 31, 2010

(65) Prior Publication Data
US 2011/0239754 A1    Oct. 6, 2011

(51) Int. Cl.
*E21B 47/11* (2012.01)
(52) U.S. Cl. .................................. 73/152.18
(58) Field of Classification Search ............. 73/152.06, 73/152.54, 152.18
See application file for complete search history.

(56) References Cited

U.S. PATENT DOCUMENTS

| | | | |
|---|---|---|---|
| 3,818,227 A * | 6/1974 | Fries | 250/303 |
| 3,991,827 A * | 11/1976 | Schall | 166/253.1 |
| 4,008,763 A * | 2/1977 | Lowe, Jr. | 166/253.1 |
| 5,892,147 A | 4/1999 | Garnes | |
| 5,929,437 A * | 7/1999 | Elliott et al. | 250/259 |
| 6,023,340 A * | 2/2000 | Wu et al. | 356/432 |
| 6,075,611 A * | 6/2000 | Dussan et al. | 356/432 |
| 6,645,769 B2 | 11/2003 | Taebi | |
| 6,672,385 B2 | 1/2004 | Kilaas | |
| 6,840,316 B2 * | 1/2005 | Stegemeier et al. | 166/250.12 |
| 7,473,672 B2 | 1/2009 | Kotlar | |
| 7,560,690 B2 | 7/2009 | Stray | |
| 2001/0036667 A1* | 11/2001 | Tayebi et al. | 436/56 |
| 2002/0020527 A1 | 2/2002 | Kilaas et al. | |
| 2003/0056952 A1 | 3/2003 | Stegemeier et al. | |
| 2007/0241277 A1 | 10/2007 | Stray | |
| 2007/0289740 A1* | 12/2007 | Thigpen et al. | 166/250.01 |
| 2008/0210421 A1 | 9/2008 | Wilson et al. | |
| 2008/0262735 A1 | 10/2008 | Thigpen et al. | |

FOREIGN PATENT DOCUMENTS

| | | |
|---|---|---|
| EP | 1355038 | 10/2003 |
| EP | 1301686 | 4/2005 |
| EP | 1277051 | 8/2006 |
| EP | 1774137 | 2/2008 |
| WO | 0181914 | 11/2001 |
| WO | 2007102023 | 9/2007 |

OTHER PUBLICATIONS

PCT/US2011/027251—Filing date Mar. 4, 2011—International Search Report dated Aug. 26, 2011.

* cited by examiner

*Primary Examiner* — John Fitzgerald
(74) *Attorney, Agent, or Firm* — David Matthews; Rodney Warfford; Robert Van Someren

(57) ABSTRACT

A technique facilitates detection of water incursion in a hydrocarbon well. Well equipment is positioned in a wellbore with one or more downhole components or regions comprising a tracer material. The tracer material is released in the presence of water to indicate incursion of water at a specific location along the wellbore. A sensor system is employed to detect the released tracer material.

17 Claims, 2 Drawing Sheets

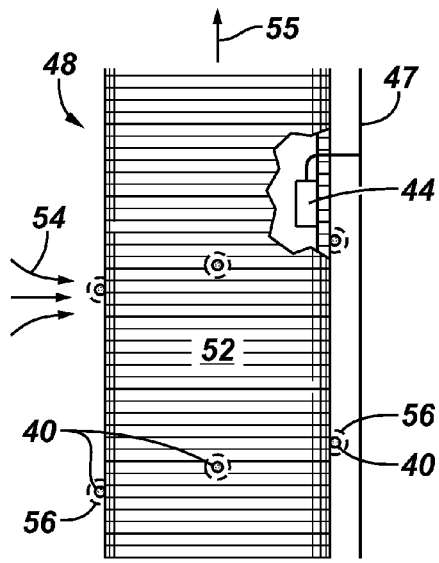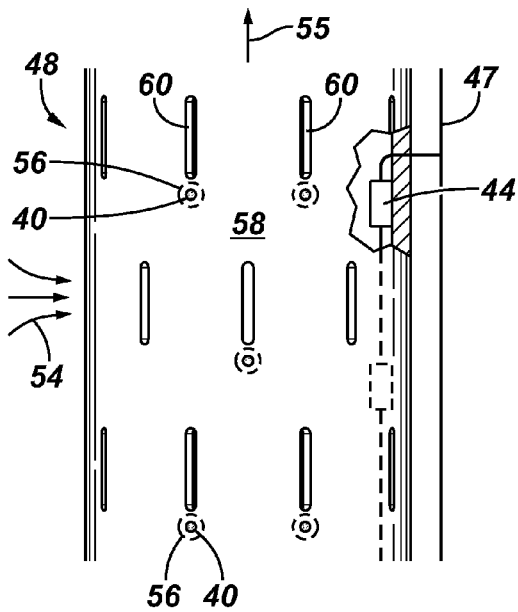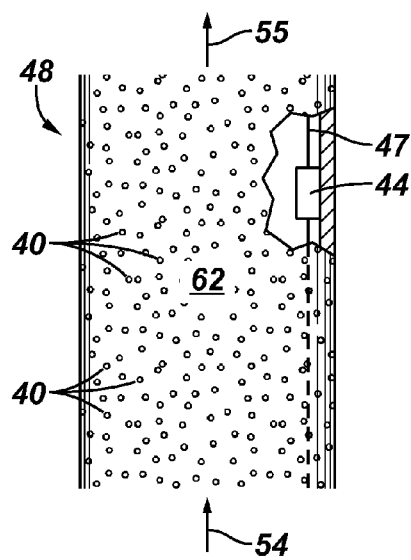

SYSTEM AND METHOD FOR DETERMINING INCURSION OF WATER IN A WELL

BACKGROUND

In many well applications, a wellbore is drilled in a subterranean formation to enable production of hydrocarbon based fluids. The hydrocarbon fluid flows from the formation into the wellbore for production to a surface facility. In some environments, however, water coning can occur which leads to the incursion of water into the hydrocarbon fluid at one or more zones along the wellbore. If the incursion of water is not addressed in a timely manner, recovery of the hydrocarbon fluid can be detrimentally affected.

SUMMARY

In general, the present invention comprises a system and methodology for determining the incursion of water in a hydrocarbon well. Well equipment is positioned in a wellbore with one or more downhole components or regions comprising a tracer material. The tracer material is released in the presence of water to indicate incursion of water at a specific location along the wellbore. A sensor system may be used to detect the released tracer material.

BRIEF DESCRIPTION OF THE DRAWINGS

Certain embodiments of the invention will hereafter be described with reference to the accompanying drawings, wherein like reference numerals denote like elements, and:

FIG. 2 is an illustration of one example of a downhole component, e.g. a well completion component, incorporating a tracer material, according to an embodiment of the present invention;

FIG. 3 is an illustration of another example of a well completion component incorporating a tracer material, according to an embodiment of the present invention; and FIG. 4 is an illustration of another example of a well completion component incorporating a tracer material, according to an embodiment of the present invention.

DETAILED DESCRIPTION

Figure 1:
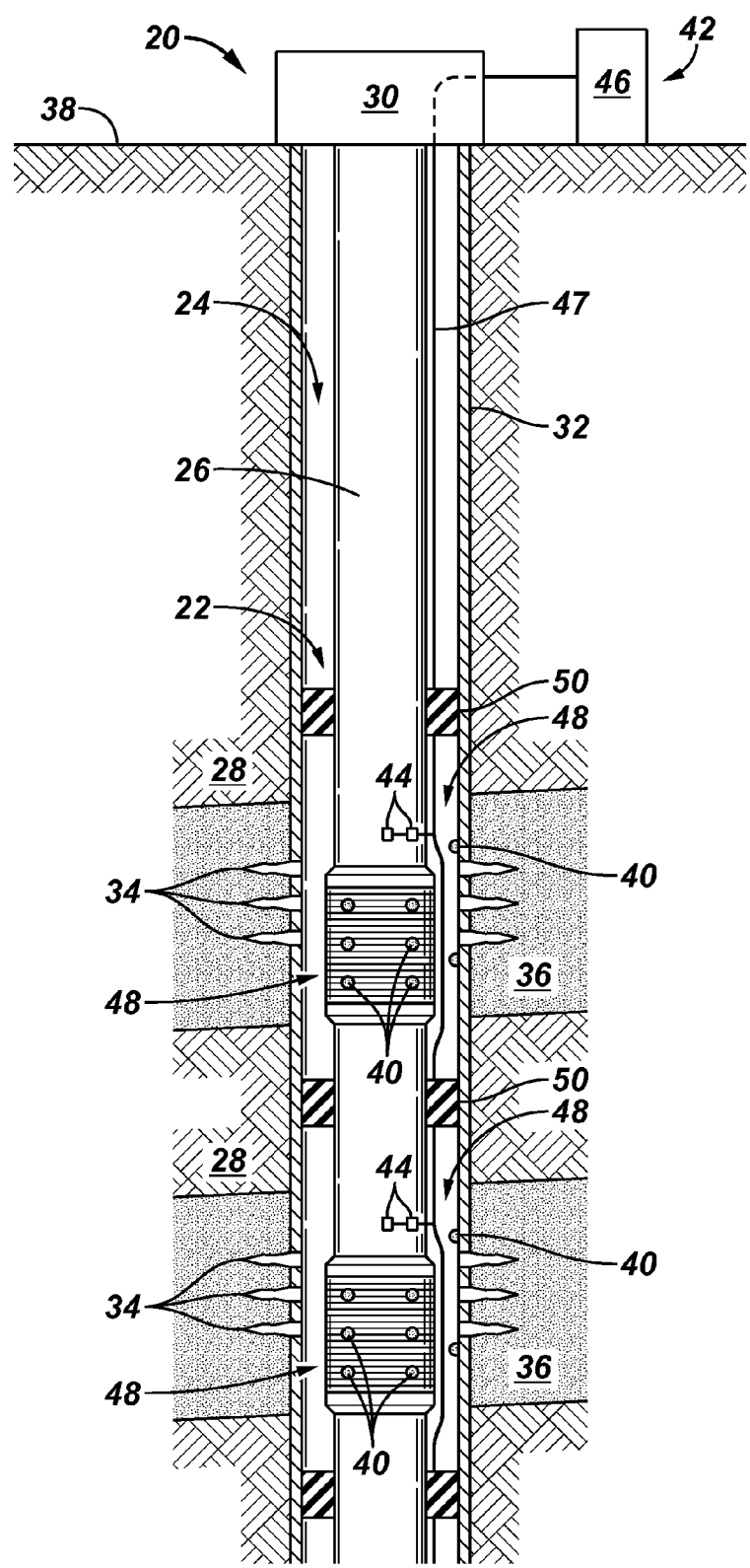
FIG. 1 is a schematic front view of one example of a well system comprising a well completion and tracer material, according to an embodiment of the present invention.

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a system and method for detecting the presence of water in hydrocarbon fluids. During the production of oil, for example, water coning or other types of water incursion may occur, thereby causing water to mix with the produced oil. If the incursion of water is ignored, the efficiency of the well decreases and, ultimately, the well may be no longer viable. Additionally, the water must be separated from the oil and then disposed of in a suitable manner.

In reservoirs where water production or water coning can become a problem, the system and methodology described herein use tracer materials to locate the entry zone of the water. According to one embodiment, chemical tracers are used to locate the entry zone. By way of specific examples, known isotopes of different metals are introduced as doping agents in metal components of a completion located in a wellbore. The metal components are made of degradable alloys containing, for example, Ca or Mg in either a metallic state or as salts. In one embodiment, the chemical tracers are located in screens or in production tubing so that once significant water production occurs, the tracer material is released. Release of the tracer material may be controlled by encapsulating or coating the tracer material in a material which dissolves in the presence of water. The tracer materials also may be incorporated into a variety of other downhole components proximate to desired well zones to provide an early indication of the incursion of water.

Referring generally to FIG. 1, one example of a generic well system 20 is illustrated as comprising a completion 22, e.g. a production completion, deployed in a wellbore 24. The completion 22 is delivered downhole via a conveyance 26 (e.g. production tubing, coiled tubing, cable-type conveyance, or other suitable conveyance) to a desired location proximate a subterranean formation 28. The conveyance 26 extends downwardly from surface equipment, such as a wellhead assembly 30. Completion 22 may be selected for use in a land based well or a subsea well according to the specific application susceptible to water incursion.

In the embodiment illustrated, the wellbore 24 is lined with a casing or liner 32 having perforations 34 proximate well zones 36 of subterranean formation 28. In a production application, the perforations 34 enable the flow of hydrocarbon based fluid, e.g. oil, from one or more formations 28 into wellbore 24 and into completion 22. The flow of hydrocarbon fluid into completion 22 enables production of the fluid to a desired collection location at a surface 38. It should be noted, the wellbore 24 is illustrated as a generally vertical wellbore but well system 20 also may be employed in deviated wells, e.g. horizontal wells, or wells having vertical and lateral wellbore sections. Some applications also may utilize open hole sections of wellbore.

Depending on the specific well application, completion 22 or another portion of well system 20 comprises one or more tracer materials 40 which are released when a given downhole component is exposed to sufficient water. However, the tracer material 40 is not released in the presence of a hydrocarbon fluid, such as oil. In a production application, for example, the tracer materials are released when exposed to sufficient inflow of water from the surrounding formation. A sensor system 42 is used to detect the released tracer material, thus enabling determination of the specific location or locations of water incursion.

According to one example, sensor system 42 comprises a plurality of sensors 44 deployed along completion 22 to detect the tracer materials 40 when released. Depending on the type of tracer material 40 used in a given application, the sensors 44 may comprise temperature sensors, pH sensors, chemical sensors, electrical sensors, or other sensors designed to detect release of the tracer material at a specific location. Sensor system 42 may comprise multiple independent sensors in some applications, but the sensor system 42 also may comprise a distributed sensor system, e.g. a distributed temperature sensor system, for use in addition to or as an alternative to the discrete sensors 44. Sensor system 42 also comprises a processing system 46 coupled with sensors 44 via a communication line 47. The processing system 46 enables processing of data from the multi-point or distributed sensors 44 to allow determination of the specific locations, e.g. well zones 36, experiencing incursion of water.

The tracer material 40 may be incorporated into a variety of downhole components 48, such as components of completion 22. For example, downhole components 48 may comprise screens, liners or other components of completion 22 through which fluid from the surrounding formation 28 flows into completion 22. In the embodiment illustrated, some downhole components 48 are located between isolation devices 50, e.g. packers, which isolate zones of the wellbore adjacent corresponding well formation zones 36.

Additionally or in alternate embodiments, the tracer materials 40 may be incorporated into other downhole components 48, such as portions of casing or liner 32. Tracer material 40 may be incorporated into or positioned along the casing 32 proximate the locations at which fluid flows from formation 28 into wellbore 24. The sensors 44 of sensor system 42 are located in completion 22, along completion 22, or external to completion 22, as appropriate, to enable detection of the tracer material 40 when released in the presence of water.

In other alternate embodiments, one or more tracer materials 40 may be pumped downhole into the wellbore 24. These tracer materials 40 may be used alone or in combination with tracer materials in components of completion 22. By way of example, the tracer materials 40 are pumped into the well as part of a proppant or sand slurry during a gravel pack operation, a proppant fracturing operation, a frac-pack operation, or another suitable operation.

In additional or alternate embodiments, the tracer materials 40 may be forced into the surrounding formation during perforation operations. In this embodiment, the tracer materials 40 may be made part of a perforating liner 32. Once the well is perforated, a perforation slug remains in the perforation cavity formed, and the slug contains specific tracer materials 40. Those tracer materials are selected to subsequently dissolve upon contact with water. By way of example, the tracer material 40 may be deployed as part of an explosive jet perforation liner and then forced into the surrounding formation during the perforation operation.

The tracer material 40 also may be injected into the surrounding formation as part of a fluid injection operation. In polymer injection, acid injection, emulsion injection, and/or water conformance treatment injection, for example, the tracer material 40 may be injected into the formation as part of the injection operation. The tracer material 40 remains in the near wellbore region and is designed for slow release upon production of water, thus identifying the location of water entry.

Referring generally to FIG. 2, one embodiment of a downhole component 48 is illustrated. In this embodiment, downhole component 48 is part of completion 22 and comprises a screen 52, such as a sand screen to filter particulates from the inflowing well fluid. The well fluid flows into screen 52, as represented by arrows 54, and then the well fluid is directed along an interior of the completion 22, as represented by arrows 55. Tracer material 40 is incorporated into screen 52 and is encapsulated or coated with a dissolvable material 56. The tracer material 40 may be placed at specific locations within and/or along the particular downhole component 48. For example, the tracer material 40 may comprise a doping agent in a metal component made of a degradable alloy. In one embodiment, the tracer material 40 is formed as, or located in, a dissolvable metal used to form a portion of well completion 22, e.g. downhole component 48. Upon contact with water, a thermo-reaction results and can be detected by sensors 44 in the form of temperature sensors or other suitable sensor types. In some applications, the tracer material 40 is distributed throughout the downhole component 48.

Furthermore, the completion 22 may be placed downhole into wellbore 24 as a combination of multiple elements that have been assembled together at the surface during the placement process. Each element assembled into the completion string may be identical to the previous element (in dimension, material, and/or purpose), or the elements may differ. For example, the elements may differ in that blank pipe elements may be placed opposite to nonproductive zones; or selected screens may be unique/different and placed opposite different productive zones according to design and selection methods known to those skilled in the art. In some applications, tracer materials 40 are incorporated into distinct elements of the completion 22, and those tracer materials 40 have distinct, different natures (e.g. different chemical compounds, different elements, and/or different isotopes) to provide a specific correspondence with specific elements of the completion. The distinct, different tracer materials 40 are released from their corresponding completion elements when a water incursion is first observed from the producing zone opposite the specific, corresponding completion element.

In the application illustrated, dissolvable material 56 dissolves in the presence of water to release the internally captured tracer material 40. Release of tracer material 40 is detected by the proximate sensor 44, and data from the sensor is transmitted to processing system 46. The processing system 46 enables determination of the incursion of water at that particular location. As a result, appropriate remedial action may be taken, e.g. reducing inflow of well fluid from that particular well zone, to preserve the efficiency and operation of the well. It should be noted that one or more sensors 44 also may be placed proximate a surface location. In some applications, the surface sensors 44 are combined with downhole sensors 44 to provide redundancy. For example, redundancy may be provided by placing a multi-tracer sensor at the surface location. The multi-tracer sensor is capable of measuring the increase of concentration of each distinct, different tracer material 40 placed downhole in the different completion string elements, e.g. in the unique screens, as described above.

In another embodiment, the downhole component comprises a liner 58 deployed as part of completion 22 or in a position surrounding completion 22, as illustrated in FIG. 3. By way of example, liner 58 may comprise a slotted liner having a plurality of slots 60 through which well fluid flows from an exterior of the liner to an interior of the liner as represented by arrows 54. Tracer material 40 is incorporated into liner 58 and is encapsulated or coated with the dissolvable material 56. Again, the tracer material 40 may be placed at specific locations within and/or along the particular downhole component 48; or the tracer material 40 may be distributed throughout the downhole component 48.

In this alternate embodiment, the completion 22 may again be placed downhole into wellbore 24 as a combination of multiple elements that have been assembled together at the surface during the placement process. Each element assembled into the completion string may be identical to the previous element (in dimension, material, and/or purpose), or the elements may differ. For example, the elements may differ in that blank pipe elements may be placed opposite to nonproductive zones; or selected screens may be unique/different and placed opposite different productive zones according to design and selection methods known to those skilled in the art. In some applications, tracer materials 40 are incorporated into distinct elements of the completion 22, and those tracer materials 40 have distinct, different natures (e.g. different chemical compounds, different elements, and/or different isotopes) to provide a specific correspondence with specific elements of the completion. The distinct, different tracer materials 40 are released from their corresponding completion elements when a water incursion is first observed from the producing zone opposite the specific, corresponding completion element.

Referring generally to FIG. 4, tracer material 40 is illustrated as dispersed throughout downhole component 48. For example, downhole component 48 may comprise a metal component, such as a metal sand screen or liner, and the tracer material may be dispersed throughout a metal material 62. When exposed to sufficient water, the material forming downhole component 48 dissolves at least partially to release the captured tracer material 40 for detection and evaluation by sensor system 42.

In one application, well system 20 is employed for the production of oil from one or more subterranean formations 28. Once water production occurs, the tracer material 40 is released and it becomes possible for an operator to evaluate the incursion of water via processing system 46. As described above, the encapsulated or coated tracer material 40 may be part of screen 52, liner 58, or another suitable downhole component. In some applications, the release of tracer material 40 is in response to annular flow of well fluid containing water along, for example, the outside diameter of a sandface completion.

The type of tracer material 40 employed may vary from one application to another. In one embodiment, tracer material 40 comprises a doping agent, such as a doping agent dispersed in a metal component made of a degradable alloy. For example, known isotopes of different metals can be introduced as doping agents in downhole components 48 that are formed of metal material. The metal parts may be made of degradable alloys containing, for example, Ca or Mg in metal form or ionized as salts. Once sufficient water incursion occurs, the tracer element 40 is released by dissolving the surrounding, dissolvable material, e.g. material 56, 62.

In some applications, tracer material 40 is captured in a metal alloy which dissolves slowly in the presence of water. When the tracer material 40 is in the form of metallic isotope atoms, the isotope is released into the production stream for detection by system sensor 44 as the metal alloy dissolves. In this example, the tracer material 40 may be selected from atoms of several metals and purified isotopes. Incorporation of purified isotopes does not necessarily require radioactive isotopes because isotopes having known distributions of atomic masses can be used and those isotopes are readily detected by suitable sensors 44.

In one specific example, a lower-cost approach is implemented by using metals which incorporate tracer material 40 in the form of lanthanides. Lanthanide (rare-earth) materials may be placed in metallic downhole component 48 in concentrations much higher than those normally found in the surrounding formations 28. Because the concentrations of such tracer materials are alien to the surrounding environment, the release of such materials can be identified in their naturally occurring isotopic distribution without further need of purification. In this example, sensor system 42 is designed to detect the release of such isotopes. By way of example, sensor system 42 may incorporate analytical techniques capable of identifying and quantifying a variety of isotopes and nuclei. Examples of such techniques include inductively coupled plasma (ICP) techniques, such as inductively coupled plasma-optical emission spectrometry and inductively coupled plasma-atomic emission spectrometry techniques. Alternatively, noninvasive in-line laser or infrared spectroscopic techniques may be employed for chemical tracer identification. In one example, Raman spectrometry may be particularly suited to organic species identification.

The well system 20 may be designed to detect and evaluate incursion of water in a variety of applications and environments. For example, tracer material 40 may be incorporated into many types of well components used in production completions and other downhole equipment. The tracer material 40 may be mounted to or incorporated into the material used to form screens, liners, and other components employed in the production of hydrocarbon based fluids. Sensor system 42 also may comprise a variety of sensors and other components depending on the type of tracer material employed and on the environment in which the production application (or other type of downhole application) is conducted. The sensors may comprise many types of chemical sensors, e.g. isotope sensors, and other sensors able to detect parameters related to the release of tracer material 40. For example, temperature sensors, pH sensors, and other types of sensors may be used to detect the release of a specific type of tracer material.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A system for use in a well, comprising:
   a completion positioned in a wellbore proximate a producing formation, the completion comprising a plurality of completion components exposed to an inflow of well fluid, wherein select components of the plurality of components comprise a tracer material which remains with the select component in the presence of hydrocarbon fluid but is released when the select component is contacted by water, the tracer material comprising a doping agent in a metal formed as a degradable alloy; and
   a sensor system to detect a location at which the tracer material is released when the select component is contacted by water.

2. The system as recited in claim 1, wherein the select components comprise sand screens.

3. The system as recited in claim 1, wherein the select components comprise portions of a slotted liner.

4. The system as recited in claim 1, wherein the doping agent is in a metal component made of a degradable alloy containing Ca.

5. The system as recited in claim 1, wherein the doping agent is in a metal component made of a degradable alloy containing Mg.

6. The system as recited in claim 1, wherein the tracer material comprises a lanthanide.

7. The system as recited in claim 1, wherein the sensor system utilizes an inductively coupled plasma technique.

8. The system as recited in claim 1, wherein the sensor system utilizes an in-line laser or infrared spectrometric technique for chemical species identification.

9. The system as recited in claim 1, wherein the sensor system comprises temperature sensors.

10. The system as recited in claim 1, wherein the sensor system comprises pH sensors.

11. A method, comprising:
    forming a well completion with a tracer material located along regions of the well completion to provide an indication of the presence of water, the tracer material comprising a doping agent in a metal component formed of a degradable alloy;
    deploying the well completion into a wellbore; and monitoring the wellbore for locations at which the tracer material is released from the well completion.

12. The method as recited in claim 11, wherein forming comprises forming the well completion with a plurality of screens containing the tracer material.

13. The method as recited in claim 11, wherein forming comprises forming the well completion with a slotted liner containing the tracer material.

14. The method as recited in claim 11, wherein forming comprises forming the tracer material as a doping agent deployed in a degradable metal alloy containing Ca.

15. The method as recited in claim 11, wherein monitoring comprises deploying sensors downhole along the well completion.

16. The method as recited in claim 11, wherein forming comprises employing different types of tracer materials at different elements of the well completion.

17. The method as recited in claim 11, further comprising employing the tracer material as part of an explosive jet perforation liner which is deployed into the wellbore for a perforation operation.

* * * * *